3,256,058
PROCESS FOR RECOVERY OF TUNGSTEN FROM SCHEELITE AND WOLFRAMITE ORES
Blair Burwell, P.O. Box 1926, Grand Junction, Colo.
Filed May 13, 1965, Ser. No. 455,529
6 Claims. (Cl. 23—15)

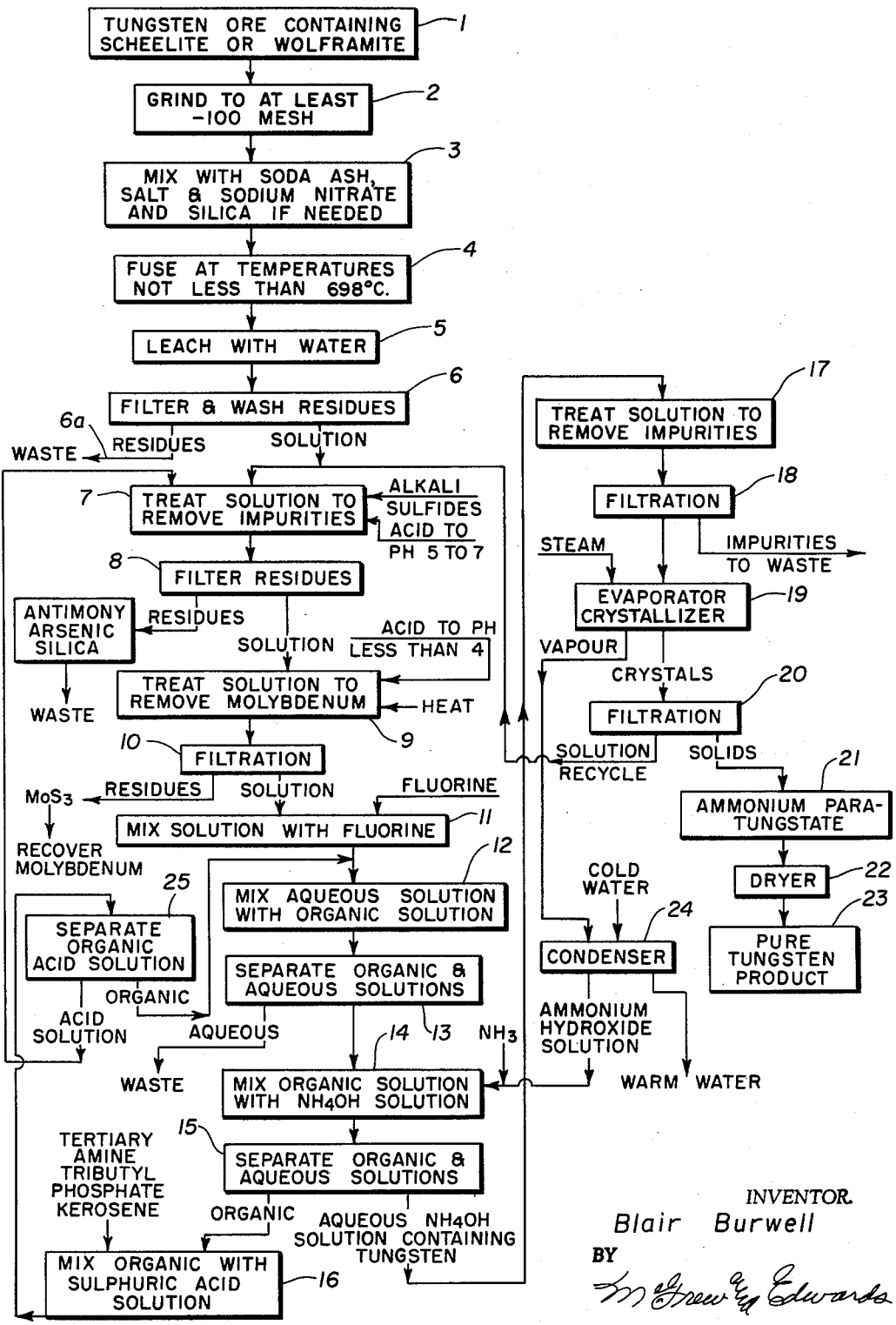

This invention relates to a process for the recovery of tungsten from ores, and more partciularly relates to a cyclic process for the production of high purity tungsten, and this application is a continuation-in-part of my co-pending application Serial No. 233,266, filed October 26, 1962.

In the manutfacture of tungsten metal, the principal raw materials used are concentrates of scheelite-type ores and concentrates of wolframite-type ores. The two types differ substantially in their chemical composition. Scheelite-type ores and concentrates are combinations of calcium and tungsten in the mineral scheelite of the formula $CaWO_4$ together with impurities including molybdenum, silica, calcium, phosporus, copper, arsenic, and antimony. Wolframite-type ores and concentrates are combinations of tungsten with iron and manganese in the mineral wolframite together with impurities of iron, manganese, arsenic, antimony, and silica.

It is the custom of the industry to process scheelite-type material by chemical decomposition methods different from wolframite because of the difference in the chemical composition and impurities between the two types. The decomposition of scheelite is almost entirely effected by subjecting the finely ground material to the leaching effect of hot concentrated hydrochloric acid whereby calcium is removed in a soluble form from the insoluble tungstic acid. Some impurities remain with the tungstic acid, such as molybdeum and silica, requiring further purification steps which are involved and costly. As a portion of the tungsten also is extracted and discarded with the acid, the efficiency of the decomposition is low, being between 80 and 85 percent.

Wolframite is usually decomposed by heating with alkali, which takes the tungsten in solution as sodium tungstate and leaves a large portion of the impurities in an insoluble form, such as iron and manganese. The efficiency of this decomposition is a function of the concentration of alkali and the temperature employed. When wolframite as a powder is subjected to a fusion with sodium carbonate at 800 to 900 degrees centigrade, a relatively complete decomposition to water soluble sodium tungstate is effected, up to 99.0 percent or more. But this high temperature decomposition also decomposes silica which is also taken into solution in the subsequent leaching operation, requiring lengthy and costly purification steps for its removal such as are described in U.S. Patent No. 2,316,583 (1943) by Highriter and Lilliendahl. When selective decomposition of wolframite is effected by decomposition with caustic alkali solution as described in U.S. Patent No. 1,293,117, at temperatures at or less than 200° C., the contamination by silica is reduced but the efficiency of the extraction is also reduced to between 80 and 90 percent of the tungsten in the raw material.

While a process has long been needed to manufacture tungsten from both scheelite and wolframite-type material in a single instllation, this has not been done up to the present time due to the difference in impurities in the two types of raw material. Individual plants select the type of ore amenable to their process. Mixed ores, that is, mixtures of two types of ore, are considered undesirable and plants installed for one type of ore cannot operate efficiently on the other. A further disadvantage to the industry resides in the limitations placed on impurities in the concentrates by the manufacturers of tungsten. These limitations increase losses and costs of the mining industry. What is needed by the industry are improved methods of processing tungsten-bearing material which can be applied to either scheelite of wolframite-type material with high efficiency in the ore decomposition step, with controls to eliminate impurities, such as silica, phosphorus and molybdenum, recovery of the molybdenum impurity as a useful compound, and production of a high purity tungsten product. Also, multiple batch steps should be eliminated which in the existing practices increase costs and decrease efficiency.

It is the object of this invention to provide such an improved process.

The method by which this object is obtained consists of an improvement in a combination of steps which can be carried out in one installation as now described.

In the practice of the invention, tungsten-bearing material of either scheelite or wolframite may be selected. It is not necessary that the material conform to the minimum content of tungsten trioxide of 60 to 70 percent, or contain certain maximum contamination of molybdenum, arsenic, phosphorus required by the conventional industry. The tungsten-bearing material is ground to suitable fineness, such as minus 150 mesh in the manner well known to the art.

The powdered material is then fused at a temperature in excess of 698° C. with a fusion mixture that liquifies at this temperature. The composition of the fusion mixture is adjusted to the type of material processed, and the tungsten content. If the material is of the wolframite type, the preferred mixture contains sodium carbonate, sodium chloride and sodium nitrate in the proportion of one and a half pounds of sodium carbonate, one pound of sodium chloride and between .05 and .10 of a pound of sodium nitrate for each pound of tungsten trioxide contained in the material treated.

Upon fusing or melting the mixture at the proper temperature, I have found that the decomposition of the material is practically complete into reaction products of liquid sodium tungstate, and solid oxides of iron and manganese, as expressed by the reactions:

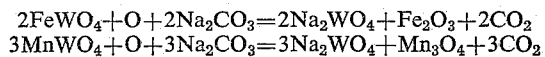

I also have found that a mixture of equal proportions of sodium chloride and sodium carbonate produces a very fluid melt at 650° C., which assists in completing the reaction and separating the liquid sodium tungstate from the solid reaction products of iron and manganese oxides. The decomposition is completed in a short time, varying from 35 to 45 minutes. The composition of the fusion mixture can be adjusted up or down according to the desire of the operator and is not specified for limitation. Approximately 0.46 of a pound of $Na_2CO_3$ is consumed in the reaction:

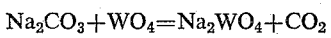

I have found that an additional pound of sodium carbonate and salt is the preferred amount to provide a fluid melt with an average wolframite-type material containing approximately 70 percent of $WO_3$. If it is desired to process lower grade material, the quantity of soda ash salt mixture in excess of reaction requirements can be provided to give the proper fluid melt.

It is an important feature of the invention to provide a fluid melt to enable the reaction to be carried out mechanically with a minimum of difficulty in conventional equipment such as a reverbatory furnace or melting pots. It has been the experience of the industry that a fusion mixture producing a pasty mass in a rotary furnace, such as is described in British Patent No. 189,873 (1922) and U.S. Patent No. 1,535,019 is costly and difficult to operate due to the difficulty of discharging the pasty mass and the high cost of the mechanical maintenance. While the benefits of a fluid salt-sodium carbonate mixture have been disclosed by Ekeley and Staddord in British Patent No. 122,051 (1919), the presence of salt in the extract solution has prevented its use in subsequent conventional methods of recovery of sodium tungstate crystals in the production of tungstic acid such as is described by Gordon and Spring in Industrial and Engineering Chemistry, June 1924, vol. 16, pp. 555-562, "Continuous Process for Manufacture of Sodium Tungstate and Tungstic Acid from Wolframite," and in Colin J. Smithell's book on "Tungsten," Chemical Publishing Company, page 28. The reason for this is that the recovery of sodium tungstate crystals by evaporation of extract solution and cooling is possible in an alkaline hydroxide solution, but the presence of salt in the solution interferes with the concentration and separation of the crystals in a pure form and the subsequent recovery of tungstic acid.

It is known that a fusion decomposition of high efficiency, such as 99 percent, also decomposes silica. The resulting tungstic acid produced from the extract solution by conventional means contains nearly 1 percent impurity. As this amount of impurity is objectionable in present market requirements, the decomposition of silica impurities has prevented utilization of the benefits of high efficiency of decomposition by fluid melts.

In the succeeding step of purification of extract solution my invention provides a new and novel method of removal of silica and soda compounds, thus permitting the use of high efficiency fusion decomposition methods without following penalty and losses. If the material to be treated is of the scheelite type it is fused in the same manner and temperature with a fusion mixture containing sodium carbonate, sodium chloride and sodium nitrate. The use of sodium nitrate is not essential, such as with wolframite, but it assists in the reaction.

In addition to the fusion mixture used on wolframite, sufficient fine silica is added, which in addition to the silica contained in the ore is sufficient to form tri-calcium silicate with the calcium contained in the scheelite mineral. I have found that when scheelite is treated with sodium carbonate by fusion to decompose the mineral and form sodium tungstate by the reaction:

$$CaWO_4 + Na_2CO_3 = CaO + Na_2WO_4 + CO_2$$

the reaction product of CaO does not separate in a melt but remains attached as a surface film on the scheelite crystal and prevents the decomposition from proceeding to completion. While this may be avoided by mechanically grinding off the film after fusion and leaching, and retreating the material, such treatment is obviously costly and inefficient.

I further have discovered that the reason for the formation of the insulating film by the bound calcium oxide is that the calcium oxide retains the molecular structure of the scheelite crystal. When the surface film is exposed to a fluid melt containing a fluid alkali silicate, such as sodium silicate, calcium silicate is formed of a different molecular structure, which separates from the scheelite crystal and permits the reaction to proceed to completion in one decomposition step. In a fluid melt, as provided in the preferred mixture, the alkali silicate is formed by the approximate reaction:

$$SiO_2 + Na_2CO_3 = Na_2SiO_3 + CO_2$$

whereupon substantially complete decomposition proceeds as represented by the reaction:

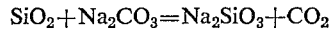
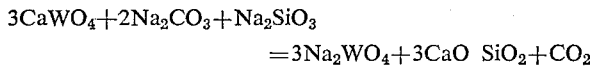

$$3CaWO_4 + 2Na_2CO_3 + Na_2SiO_3$$
$$= 3Na_2WO_4 + 3CaO \cdot SiO_2 + CO_2$$

It is important that this reaction be carried on at a temperature above the melting point of sodium tungstate, which is approximately 698 degrees centigrade, and below the decomposition temperature of calcite ($CaCO_3$) to CaO, which is 825° approximately, when the scheelite material contains calcite as an impurity. The reason for this is that the consumption of sodium silicate is increased greatly by the calcium oxide formed in the decomposition of calcite if the temperatures exceed 825° C. When the temperatures are maintained between 700° and 825° centigrade the decomposition of scheelite is selective and calcite does not interfere. If calcite does not occur as an impurity, the limitation of top temperature of 825° is not necessary.

Tests on decomposition of scheelite-type material to explain this invention were performed as described hereinafter. A sample of typical scheelite concentrates containing 67% $WO_3$, 25.5% CaO, 0.40% $SiO_2$ and 1.10% Mo was pulverized to minus 150 mesh and used in each of the following tests:

Test 1—Fusion decomposition without silica and salt.
(a) 200 grams of the material was mixed with 201 grams of sodium carbonate and 7 grams of sodium nitrate and fused for 1 hour at 800 to 850 degrees centigrade, in a small muffle furnace. The pasty mass was cooled and leached with water. The residue weighed 171 grams and contained 40 grams of $WO_3$. The efficiency of the decomposition was 70%.

(b) The residue from (a) was reground and fused again with the same proportions of sodium carbonate and sodium nitrate and at the same temperature and time. The melt was again leached, resulting in a residue weighing 155 grams and containing 8 grams of tungsten. The efficiency of the second treatment was 82% and the combined efficiency was 94% in two stages of treatment.

Test 2—Fusion decomposition with salt but without silica.

200 grams of the same scheelite material was fused with the same quantity of sodium nitrate and sodium carbonate as used in test 1 for 1 hour at 800 to 850 degrees. In addition 134 grams of NaCl was added before fusion. The mixture became a liquid at 650° C. The melt was cooled and leached with water. The residue contained 28.06 grams of $WO_3$ and the efficiency of decomposition was 79% approximately. While the efficiency was improved by a fluid melt a second treatment was necessary to obtain an economical decomposition.

Test 3—Fusion decomposition with salt and 71% of theoretical silica to form tri-calcium silicate.

In this test 100 grams of the same material as 1 and 2 was mixed with a fusion mixture containing 100 grams of $Na_2CO_3$, 67 grams of NaCl, 4 grams of $Na_2NO_3$ and 5 grams of fine silica was fused at 800 to 850° for 45 minutes. The fluid melt was cooled and leached with water. The residue contained 8.29 grams of $WO_3$, with a decomposition efficiency of 94%.

In this test, 71% of the amount of silica necessary to form tri-calcium silicate with the bound CaO of the scheelite mineral was added, calculated as follows:

As pure scheelite contains 24.4% CaO and 75.8% $WO_3$, the material treated contained 87% by weight of scheelite and 21% bound Ca. To form tri-calcium silicate with the 21 grams of CaO requires 36% by weight of $SiO_2$, or 7.57 grams of $SiO_2$. The addition of 5 grams of $SiO_2$ plus .4 gram contained in the material was 71% approximately of the theoretical amount to form tricalcium silicate. The efficiency of the decomposition 94%, which is a direct function of the efficiency of 79% without silica, plus 71% of the deficiency of 21%, effected by a partial addition of silica.

Test 4—Fusion decomposition with salt and 150% of theoretical silica.

In this test, the conditions and composition of Test 3 were used with the exception that the silica was increased to 11 grams, or 1.5 times theoretical. With the same time and temperature the leached residue contained .35 gram of $WO_3$ or an efficiency of decomposition of 99.4%. In this test, 100 grams of the scheelite-type material and an excess of silica over the theoretical, of 50% effected a practically complete decomposition in one fusion step.

In the application of this invention the preferred way to supply the silica compound required for efficient decomposition is to add fine silica to the mixture containing sodium carbonate, thus forming sodium silicate. The same decomposition result can be obtained by adding sodium silicate directly to the mixture as demonstrated by the following test.

*Test 5*—Fusion decomposition with salt and sodium silicate.

100 grams of the scheelite material used in test 4 was fused with 100 grams of sodium carbonate, 67 grams of sodium chloride, 4 grams of sodium nitrate, and sodium silicate containing 11 grams of $SiO_2$. The mixture was fused for 45 minutes at 800–825° C. The fluid melt was cooled and leached with water. The residue contained 0.30 gram of $WO_3$, or an efficiency of 99.5%.

Tests of fusion extraction of wolframite-type material to demonstrate the efficiency of decomposition were performed as described in a typical experiment as follows:

*Test 6*—Fusion decomposition of wolframite-type material.

100 grams of wolframite-type material containing 73.3% $WO_3$ was ground to minus 150 mesh and fused for 40 minutes at a temperature of 800–825° with a fusion mixture containing 108 grams of sodium carbonate, 73 grams of salt and 5 grams of sodium nitrate. The fluid melt was cooled, leached with water and the separate residue analyzed for tungsten. The residue weighed 37 grams and contained a trace only of tungsten indicating a substantially complete decomposition. The separated solution contained 55 grams of $WO_3$ per liter and 16 grams of $SiO_2$ in a volume of 1320 ml.

*Test 7*—Comparative test of decomposition by alkali hydroxide solution.

135 grams of wolframite-type material of the same composition as used in test 6 was treated in a pressure autoclave with 117 grams of sodium carbonate, 94.2 grams of NaOH and 900 ml. of water for 2 hours at steam pressure of 200 p.s.i. and temperature of 385° F. This corresponds to an extractive process used in the industry. The charge was cooled and filtered and the residue of 42.5 grams found to contain 4.9 grams of $WO_3$, or a decomposition efficiency of 95.3%. The filtered solution and washes contained 3 grams of $SiO_2$. A reduction in the decomposition of silica from 16 to 3 grams was effected by a reduction of decomposition efficiency of approximately 4%, from the decomposition test No. 6.

The fluid melt produced in the first step of the invention is tapped or poured to a suitable cooling device, such as a casting wheel, and subjected to leaching by water, after grinding or granulating to assist in dissolving the soluble sodium compounds. The leached slurry is separated by filter means and the separated alkaline extract solution treated in a purification step to remove impurities.

In the practice of this invention, 98% or more of the tungsten will be contained in the separated alkaline solution as sodium tungstate, together with sodium chloride and sodium hydroxide. The extract solution will also contain soluble soda salts of molybdenum, silica, alumina, magnesia, fluorine, antimony and arsenic, depending upon the impurities in the ore. The pH of the solution will be usually above 10. The second step of the invention provides for the removal of these impurities.

When molybdenum, arsenic and antimony occur as impurities I have found that the addition of a soluble alkali sulfide, such as $Na_2S$ or NaHS in sufficient quantity to form $NaSbS_2$, $NaAsS_2$ and $Na_2MoS_4$ plus an excess from 50 to 80% will precipitate these impurities as acid, insoluble sulfides, when the pH of the solution is reduced by sulphuric acid to approximately 3 and the solution heated to 80° C. In this purification step, arsenic and antimony form the insoluble sulfide at a pH of 4.0 to 5.6 while molybdenum forms the insoluble sulfide $MoS_3$ at a pH from 3 to 4.0, thus providing a means for separating the valuable molybdenum from arsenic and antimony in solutions containing the three as impurities. The reactions in this purification step have been found to be approximately as follows:

Upon adding NaHS to the alkaline extract solution—

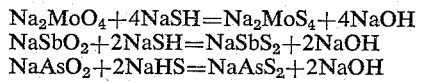

Upon acidification to a pH of from 5 to 6—

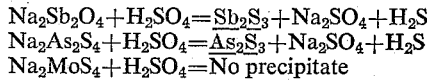

Upon acidification to a pH less than 5 and heating to 90° C.—

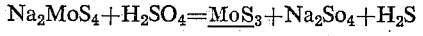

When silica, phosphorus, alumina and magnesia are present as impurities, it is found that these impurities will form insoluble complexes when the solution is reduced to less than 8 with sulphuric acid, which can be separated by filtration means. This separation is preferably made in a relatively cool solution, between 30° and 50° C. The principal component in this purification step is alumina. In the illustrative reaction:

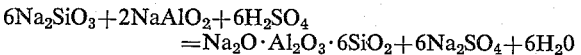

It is found that a substantial amount of phosphorus, if not all, is co-precipitated with the silica, alumina and magnesia. The preferred proportions of alumina to silica in this purification step is 1 to 3.6. When scheelite-type ores are processed, alumina is a common impurity and is extracted in the decomposition step. If sufficient alumina is not present for the reaction in the extract solution, alumina or magnesia can be added in any convenient form such as aluminum sulfate, chloride or sodium aluminate, or magnesium chloride. Such an addition can be made at a pH from 4 to 11.

*Test 8*—The following tests were performed to demonstrate the removal of impurities in an extract solution containing tungsten, antimony and arsenic.

3000 ml. of an extract solution containing 282 grams of $WO_3$, 4.9 grams of Sb and 1.4 grams of As were treated with 20 grams of 45% sodium bisulfide solution and acidified to a pH of 5 with 524 grams of sulphuric acid. The red precipitate was filtered, washed and dried and found to contain 27.4% Sb and 11.6% As and 1.5% $WO_3$. The weight of the cake was 13 grams and contained 4.85 grams of antimony and 1.38 grams of As.

*Test 9*—

To 1000 ml. of an extract solution containing 45 grams of $WO_3$, 3.7 grams of Mo, 11 grams of $SiO_2$ and 1.0 gram of Al and a pH of 11, 7 grams of Al as $Al_2(SO_4)$ were added and 10 grams of $Na_2S$, and the solution acidified with $H_2SO_4$ to a pH of 5.0. After cooling, the solution was clarified by filtration and the clarified solution found to contain .015 gram of $SiO_2$ per liter. The clarified solution was then acidified to a pH of 3 with sulphuric acid and heated to 90° C. The solution was filtered and the separated solids of $MoS_3$ were washed, weighed and analyzed and found to contain 34% Mo and 1.2% $WO_3$ and 3.69 grams of Mo.

As a result of the purification treatment in the second step of the invention, the solution is acidic and contains impurities consisting of soda salts and a small residual amount of silica and phosphorus. Usually the silica is present in a quantity approximating .015 gram per liter and is combined with tungsten as silico tungstic acid, of the formula $H_4SiW_{12}O_{40}$, or sodium silico tungstate, of the formula $Na_2SiW_{12}O_{40}$. In this compound, one gram of silica is combined with approximately 46.4 grams of tungsten and forms a very heavy molecule with an atomic weight of 3,419. Residual phosphorus will also occur as a similar sodium phospho tungstate, or phospho tungstic acid.

The practice of my invention will be described with reference to the accompanying flow sheet drawing illustrating a typical circuit for the treatment of both scheelite and wolframite ores. In said circuit, tungsten ores containing scheelite or wolframite are conducted from a suitable source of supply such as ore bins 1 and are delivered into a grinding stage 2 where the ore is reduced to a fine size— at least minus 100 mesh—preparatory to subjecting it to a fusion temperature in stage 4 to liquefy it. Before subjecting the ground ore to heating at the fusion stage, it is mixed with sodium carbonate, sodium chloride and sodium nitrate in a mixing stage 3. Silica also is added if scheelite is present.

Heating of the mixture at fusion stage 4 produces a fluid melt at 650° C. and decomposition is completed in from 35 to 45 minutes when temperatures of at least 698° C. are maintained. A high efficiency fusion decomposition results, on the order of 99%. At the end of the heating interval, the fused mixture is cooled and leached with water at stage 5. After leaching, the tungsten-bearing solution is separated from the insoluble residue by filtration at stage 6. The separated insoluble residue is discharged to waste as shown at 6a and the tungsten-bearing solution remains in the circuit for additional treatment.

The separated solution is treated at stage 7 for removal of impurities, such as silica, arsenic and antimony by addition of acid and alkali sulfide. This separation is attained by an acid addition establishing a pH between 5 and 7 followed by filtration at step 8 to separate the tungsten-bearing solution from insoluble residue. Following step 8 the solution is treated in step 9 to remove any molybdenum present, by adding acid to establish a pH less than 4 and heating to a temperature of approximately 90° C. whereupon an insoluble compound of molybdenum tri-sulfide ($MoS_3$) is formed and separated from the tungsten-bearing solution in filtration step 10.

The solution then is treated in step 11 by the addition of any soluble salt of fluorine or hydrofluoric acid to convert the silica and phosphorus in the tungsten compound to a compound of the type $Na_2SiF_6$ and $Na_2PF_6$ preparatory to a liquid ion exchange treatment. The solution from step 11 is conducted to a solvent extraction stage 12 in which the organic solvent is introduced. I have found that the addition of a fluoride salt or hydrofluoric acid to the acid solution converts the silica and phosphorous in the tungsten compound to a compound of the type $Na_2SiF_6$ or $Na_2PF_6$. In this form, I have found that the $WO_3$ ion is extracted in the organic solution free of contamination by silica and phosphorous, thus permitting its separation and purification from soda, silica and phosphorous.

It appears that this effect can be accomplished by adding any soluble salt of fluorine or hydrofluoric acid. It is preferred to add the fluorine salt to the acid solution after separating the major part of the impurities at a pH between 5 and 7 in order to reduce the consumption of fluorine. It is the preferred practice to add sufficient fluorine to form $SiF_6$ and $PF_6$ with all the silica and phosphorous present, plus an excess of approximately 100%.

The organic solvent employed in step 12 is preferably made up of an amine of a fatty acid dissolved in a suitable organic solvent, both of which are insoluble or sparingly soluble in water. The amine must be capable of forming organo-tungsten amine complexes which are insoluble in water and insoluble in the organic phase. I have found that tertiary amines, represented by the formula

where R represents a $C_8$–$C_{10}$ chain mixture are suitable for this purpose, although the invention is not limited to this particular carbon chain length. Tri (tridecyl) amine, triamyl amine or triisoctyl amine and trilauryl amine among other variations can be used.

Organic extraction is best accomplished by contact of the two phases in one or more mixer-settler combinations. Tributyl phosphorous in kerosene and diisobutyl ketone in kerosene is satisfactory as an organic diluent, although other extractant diluents are satisfactory and a number of other solvents are usable in the invention. The extraction is preferably carried out at temperatures at or about 100° F. for both phases in order to assist settling and assist dispersion of the amine extractant in the organic diluent. The extraction can be carried out at lower temperatures as desired. I have found that under proper conditions, the organic extractant can carry up to 25 grams of $WO_3$ per liter.

After extracting the tungsten from the aqueous phase and separating the organic by settling means in step 13, the organic phase will contain approximately 99% of the tungsten present in the aqueous phase. It also contains some mechanically entrained drops of aqueous solution. In order to remove all contamination, the organic phase may be washed with water in a mixer-settler, such as used in the original extraction. I prefer to use such a mixer-settler because the flow rates and separating rates are the same and one or more mixer-settlers can be used as required. The water used in this step preferably should be silica-free or deionized.

As a result of the removal of soluble impurities in the extract solution in steps 7 and 9 of the flow sheet and the separation of the tungsten anion from the soda cation in the solvent extraction of step 12, the tungsten is contained in the organic solution separated from the aqueous extract solution which may be discarded as shown at 13. After washing the organic phase in water, the tungsten is stripped from the organic phase shown as stripping stage 14 by mixing in a mixer-settler unit with a dilute solution of ammonium hydroxide. This solution preferably should be substantially free of silica, soda and other dissolved salts and will contain enough ammonia ($NH_3$) to form $(NH_4)_2WO_3$ with all the tungsten contained in the organic and in addition have sufficient excess ammonia to establish a pH in excess of 7.5.

The preferred method of preparing this extract solution is to use the dilute ammonia-bearing condensate from a later evaporation step. However, if the operator does not have a substantially silica-free solution to affect this stripping, I have found that the addition of a small amount of ammonium fluoride salt or HF will prevent the contamination of silica in the ammonium paratungstate extracted from the strip solution. It is desirable, but not necessary, to extract the tungsten from the organic phase in an aqueous phase containing at least 9% or 100 grams of $WO_3$ per liter. This is principally for the economy of conducting the succeeding steps of the process. It also is desirable to avoid the extraction in a solution containing in excess of 15% $WO_3$ for the reason that solid ammonium paratungstate and possibly meta-tungstate separates out in the aqueous extract solution which mechanically interferes with the liquid-to-liquid separation. To effect this condition, the stripping is preferably done in one of two mixer-settler combinations wherein a portion of the strip solution is recirculated in contact with the organic to establish a tungsten concentration between 9 and 15% expressed as $WO_3$.

In this step, the tungsten-bearing strip liquor is clarified of any accidental solid inclusions by filtration as shown at 17. If the solution contains a trace of phosphorous from accidental contamination or otherwise, I have found that a small amount of a solid magnesium oxide added to the strip solution as shown at 17 will remove the phosphorous substantially completely as ammonium magnesium phosphate. The impurities thus removed are separated by filtration as shown at step 18 and the clarified liquor preferably is treated to recover its tungsten values by evaporation at evaporator crystallizer stage 19 whereby the excess ammonia is removed with the water vapor discharging at 19 and condensed for cyclic reuse at step 24. By this means, the soluble ($NH_4WO_3$) compound is decomposed to form insoluble ammonia paratungstate, $5(NH_4)_2O.12WO_3.5H_2O$. The recovery and reuse of ammonia in this cyclic manner is of substantial benefit in reducing the costs of the process, as well as in providing a source of pure and silica-free ammonia stripping solution.

The ammonia paratungstate of the mother liquor from evaporator stage 19 is conducted to filtration means 20 and washed with distilled water. A small amount of the mother liquor preferably is recycled to the process to avoid a build-up of organic impurities. I have found that a recycle of from 5–10% of the solution will maintain a high purity product. The washed ammonia paratungstate from filtration stage 20 is discharged into a drying stage 22 and dried at temperatures of from 200° to 220° F. for a sufficient time to expel the moisture, after which it is discharged as product.

After stripping the tungsten from the organic phase by the ammonia introduction as shown at stage 14, it will be found that the amine organic must be treated by an acid solution to restore a sulfate or nitrate ion before its reuse in extracting tungsten from aqueous solution. This can be effected by supplying $SO_4$ ions in the tungsten solution or by treating the stripped organic phase in a mixer-settler with an aqueous solution of sulphuric acid as shown at step 25 at the will of the operator. The preferred way is to treat the organic phase in a mixer-settler with approximately .1 N sulfuric acid solution, then separating the aqueous sulfuric acid and reusing it in a cyclic manner while maintaining the acid concentration at a desired level. It sometimes is desirable to include a small amount of nitric acid in this acid solution.

As an example of a process embodying the steps of this invention, ammonium paratungstate was prepared from wolframite type ore and scheelite type ore as follows:

In a small reverbatory furnace, direct fired by gas, scheelite concentrates containing 67% $WO_3$ and ground to minus 150 mesh and mixed with a fusion mixture consisting of 1 pound of sodium carbonate, .67 pound of sodium chloride, five hundredths of a pound of sodium nitrate and 11 hundredths of a pound of fine silica sand for each pound of scheelite material was fused for 45 minutes at a temperature of 825° C. The furnace was charged each 45 minutes with 1.1 pounds of the mix and the liquid melt was tapped and cooled at similar intervals and a total of 5 charges were thus fused.

The cooled melt was ground in water, and the residue was separated from the solution by a vacuum filter. After five charges, the separated solution contained 98.6 percent of the tungsten charged in a solution containing 56 grams and the separated solids assayed .65% $WO_3$ and weighed 2.75 pounds. The scheelite material also contained 1.10% Mo and the extract solution contained .9 gram per liter.

In the same reverbatory furnace, wolframite concentrates containing 73% $WO_3$ mixed with a similar fusion mixture containing for each pound of wolframite, 110 grams of sodium carbonate, 73 grams of sodium chloride and five hundredths of a pound of sodium nitrate was fused at the same temperature and time as the scheelite. The cooled melt from the wolframite was likewise ground, leached and filtered. The separated solution was found to contain 99.6% of the tungsten in the wolframite charge and the residues weighing 2.55 pounds contained .25% $WO_3$.

The clarified solution from the scheelite and wolframite fusions was combined in equal proportions and treated for the removal of excess silica and the recovery of molybdenum as follows:

To 5000 ml. of combined solution containing 57 grams of $WO_3$, 0.45 gram of Mo and 3.66 grams of $SiO_2$ per liter was added a solution containing 8.5 grams of $Na_2S$ and 10 grams of $Al_2SO_4$. The pH of the combined solution was 11.1. Sufficient $H_2SO_4$ was added to reduce the pH to 7 and the solution was filtered and the filtrate contained 0.02 $SiO_2$. The clarified solution was treated with additional sulfuric acid to establish a pH of 3.0 and was heated to 90° C. The precipitated molybdenum was separated by filtration. The precipitate weighed 7 grams and contained 32% Mo. The clarified filtrate contained a trace of Mo.

To the clarified filtrate 30 grams of ammonia acid fluoride was added and the acid solution was treated at the rate of 10 ml. per minute in a continuous mixer-settler unit with 30 ml. per minute of an organic solution composed of 10 volume percent of tertiary fatty acid amine known under the trade name of "Alamine" by General Mills.

The circuit was composed of one mixer-settler unit to extract the tungsten, one mixer-settler unit to wash the separated organic, and two mixer-settler units where ammonium hydroxide solution containing 2.5% $NH_3$ was circulated countercurrent to the organic flow at the flow rate of 20 ml. per minute. This flow was recycled until the ammonium strip solution contained 100 grams per liter of $WO_3$ whereupon a sufficient flow of hydroxide solution was diverted to maintain this concentration of tungsten.

The stripped organic was subjected to one mixer-settler contact with recirculating acid solution containing 10% $H_2SO_4$, after which the sulfated organic was returned to the extraction mixer-settler for reuse in extracting tungsten. After the solvent extraction unit had reached equilibrium, it was operated for 100 hours and samples of the various components of the system were taken.

The aqueous extract solution contained a trace of tungsten, or an efficiency in excess of 99% in the removal of the tungsten anion into the organic. The ammonium tungstate aqueous solution contained 9.6% $WO_3$. This was treated by evaporation and filtration to produce solid crystals of ammonium paratungstate which analyzed:

| | Percent |
|---|---|
| $WO_3$ | 89.3 |
| Mo | 0.005 |
| Na | 0.01 |
| Non volatile residue | 0.004 |
| Loss on ignition | 10.7 |

I claim:
1. A process of recovering tungsten values from scheelite or wolframite type ores or concentrates, which comprises fusing such a material in powdered form with a mixture of sodium carbonate and sodium chloride containing sufficient silica compounds to form calcium silicate with any calcium oxide combined with the tungsten and at a temperature not less than 698° C., leaching the fused material in water, separating the tungsten-bearing alkaline leach liquor from impurities, introducing an alkali sulfide into the leach liquor in a quantity sufficient to form a soluble sulfide compound with antimony, arsenic and molybdenum present, acidifying the leach liquor after sulfide introduction to establish a pH between 5 and 7, separating the impurities from the acidified leach liquor by filtration, adding acid to the separated solution of filtration to establish a pH less than 4, subjecting the acidified solution to heating, removing molybdenum residues from the acidified solution by filtration, adding a soluble hydrofluoric acid material to the solution after molybdenum removal to give at least 6 molecules of fluorine for every molecule of silica and phosphorus contained in the solution, extracting the anionic tungsten component of the aqueous solution with a water-insoluble reagent selected from the group consisting of tertiary tridecyl, triamyl, triisooctyl and trilauryl amines in a diluent selected from the group consisting of ketones and kerosene while the cationic sodium component remains in the aqueous solution, stripping the organic extractant containing tungsten with a dilute ammonium hydroxide solution having an excess of ammonia to establish a pH of at least 7.5, evaporating the tungsten-bearing strip solution to precipitate crystalline ammonium paratungstate, and discharging dried ammonium paratungstate from the treatment as a final product.

2. A process of recovering tungsten values from scheelite or wolframite type ores or concentrates, which comprises fusing such a material in powdered form with a mixture of sodium carbonate and sodium chloride containing sufficient silica compounds to form calcium silicate with any calcium oxide combined with the tungsten and at a temperature not less than 698° C., leaching the fused material in water, separating the tungsten-bearing alkaline leach liquor from impurities, introducing an alkali sulfide into the leach liquor in a quantity sufficient to form a soluble sulfide compound with antimony, arsenic and molybdenum present, acidifying the leach liquor after sulfide introduction to establish a pH between 5 and 7, separating the impurities from the acidified leach liquor by filtration, adding acid to the separated solution of filtration to establish a pH between 2 and 3, subjecting the acidified solution to heating, removing molybdenum residues from the acidified solution by filtration, adding a soluble hydrofluoric acid material to the solution after molybdenum removal to give at least 6 molecules of fluorine for every molecule of silica and phosphorus contained in the solution, extracting the anionic tungsten component of the aqueous solution with a water-insoluble reagent selected from the group consisting of tertiary tridecyl, triamyl, triisooctyl and trilauryl amines in a diluent selected from the group consisting of ketones and kerosene while the cationic sodium component remains in the aqueous solution, stripping the organic extractant containing tungsten with a dilute ammonium hydroxide solution having an excess of ammonia to establish a pH of at least 7.5, evaporating the tungsten-bearing strip solution to precipitate crystalline ammonium paratungstate, and discharging dried ammonium paratungstate from the treatment as a final product.

3. A process of recovering tungsten values from scheelite or wolframite type ores or concentrates having some calcium, silica, phosphorous, arsenic and antimony components and substantially no molybdenum, which comprises fusing such a material in powdered form with a mixture of sodium carbonate and sodium chloride containing sufficient silica compounds to form calcium silicate with any calcium oxide combined with the tungsten and at a temperature not less than 698° C. thereby converting tungsten compounds in the ore to soluble sodium tungstate and leaving some impurities present in the ore as insoluble material, leaching the fused material in water to dissolve the sodium tungstate, removing the insoluble residue from the aqueous leach liquor by filtration, introducing an alkali sulfide into the leach liquor in a quantity sufficient to form a soluble sulfide compound with antimony or arsenic components present in the leach liquor, acidifying the leached liquor with sulfuric acid after sulfide introduction to establish a pH between 5 and 7, separating the impurities from the acidified leach liquor by filtration, adding fluorine in the form of a soluble fluorine salt or hydrofluoric acid to the liquor in a quantity to give at least 6 molecules of fluorine for every molecule of silica and phosphorous contained in the solution, said liquor being acidified to a pH less than 4 before fluorine introduction, extracting the anionic tungsten component of the fluorine treated acidic solution with a water-insoluble reagent selected from the group consisting of tertiary tridecyl, triamyl, triisooctyl and trilauryl amines in a diluent selected from the group consisting of ketones and kerosene while the cationic sodium component remains in the aqueous solution, stripping the organic extractant containing tungsten with a dilute ammonium hydroxide solution having an excess of ammonia to establish a pH of at least 7.5, clarifying the ammonium hydroxide solution containing the extracted tungsten by filtration, subjecting the clarified solution to evaporation to expel most of the water and contained ammonia and precipitate crystalline ammonium paratungstate, and discharging dried ammonium paratungstate crystals as a final product of the treatment.

4. A process as defined in claim 3, in which vapors from the evaporation stage are collected and condensed to form the ammonium hydroxide solution used in stripping the organic extractant containing tungsten.

5. A process as defined in claim 3, in which organic solution separated from the aqueous solution following stripping is mixed with sulfuric acid solution and recycled to the ion exchange extraction stage.

6. A process as defined in claim 3, in which some sodium nitrate is mixed with the sodium carbonate and sodium chloride mixture introduced into the ore fusing stage of the treatment.

References Cited by the Examiner

UNITED STATES PATENTS

| | | | |
|---|---|---|---|
| 1,388,857 | 8/1921 | Giles et al. | 23—18 |
| 2,339,888 | 1/1944 | Smith | 23—18 |
| 2,473,703 | 6/1949 | Colton et al. | 23—51 |
| 2,963,342 | 12/1960 | Polloton et al. | 23—18 |
| 3,052,516 | 9/1962 | Drobnick et al. | 23—51 |
| 3,158,438 | 11/1964 | Kurtak | 23—51 X |

FOREIGN PATENTS 122,051  1/1919  Great Britain.

OSCAR R. VERTIZ, *Primary Examiner.*

BENJAMIN HENKIN, *Examiner.*

H. T. CARTER, *Assistant Examiner.*